Figure 1:
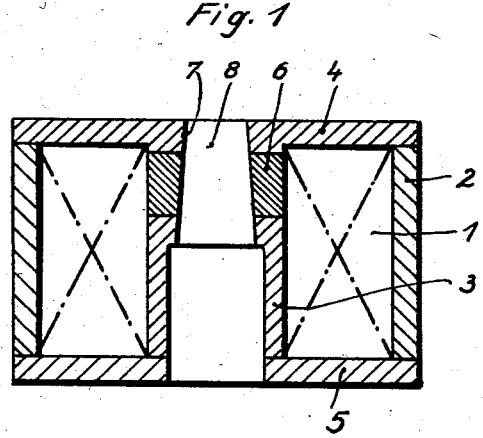

Nov. 4, 1958 S. LEISEGANG ET AL 2,859,363
ELECTRON LENSES
Filed Sept. 16, 1954

POLE SHOES 12 & 14
ARE ROTATABLE
CLOCKWISE OR
COUNTER-CLOCKWISE,
FOR ADJUSTMENT
PURPOSES,
AFTER LOOSENING
ANNULAR SCREW
RING 15.

Inventors:
Siegfried Leisegang
and
Otto Wolff

United States Patent Office 2,859,363
Patented Nov. 4, 1958

2,859,363
ELECTRON LENSES

Siegfried Leisegang, Berlin-Zehlendorf, and Otto Wolff, Berlin-Frohnau, Germany, assignors to Siemens & Halske Aktiengesellschaft, Berlin and Munich, Germany, a German corporation Application September 16, 1954, Serial No. 456,463

Claims priority, application Germany September 24, 1953

7 Claims. (Cl. 313—75)

Our invention relates to electron microscopes and similar electron optical devices, and more particularly to an electron lens system for such devices.

The objective lenses of electron microscopes must satisfy exacting requirements as regards mechanical workmanship, accurate centering of the lens bores of the various parts relative to each other and, in the case of magnetic lenses, also as regards magnetic homogeneity of the materials used. For securing best centering accuracy of the pole-shoe bores in magnetic lenses or of the electrode bores in electrostatic lenses relative to each other, it has heretofore been the practice to first rigidly join these essential lens parts with each other by screwing or otherwise fastening them together and then to bore the whole assembly in a single position on a lathe. However, the lenses thus produced are not always satisfactory. This is because accurate centering in mechanical respects does not necessarily ensure a corresponding accuracy of the lens field which also depends upon homogeneity of the material. For that reason, such lenses may have an excessive axial astigmatism; and where such errors are observed, it is usually necessary to discard the entire lens system.

It is an object of our invention to minimize or obviate such shortcomings. More particularly, it is an object to devise an electron lens system wherein the parts most essential for the lens effect can be arranged to secure best centering in the electron-optical sense so as to make the lens system as free as possible from axial astigmatism.

To this end, and in accordance with a feature of the invention, we mount the field-determining lens parts, namely the electrodes or pole shoes of the lens system, into a sleeve or shell member with respect to which the lens parts are revolvably adjustable in coaxial relation to each other thus affording a compensation or correction of any lens errors that may be due to the relative position of the field-determining parts. This readily affords testing each lens by observing its effects within an electron-optical system and then turning the lens parts relative to each other to the position with which the lens has minimum axial astigmatism.

The invention, applicable to electric as well as magnetic lenses, is particularly advantageous to lenses of the magnetic type because experience has shown that bending distortion of the electron-optical axis in magnetic lenses is in far greater measure due to inhomogeneity of the pole-shoe material than to deficient mechanical centering. Optical faults caused by such inhomogeneity cannot be corrected by any refinement in machining, while in such cases the present invention affords a particularly effective remedy.

There are electron lens systems of the magnetic type whose pole faces are formed by two pole shoes joined with an intermediate non-magnetic spacer piece to form a pole-shoe assembly, and this assembly is inserted as a whole in the central bore of an annular magnetic excitation structure. Relating to such magnetic lenses, and according to a more specific feature of the invention, the two annular and coaxial pole shoes and the non-magnetic spacer are joined together by a surrounding sleeve or shell relative to which one or both pole shoes are rotatably adjustable. This permits checking and setting the lens by turning one pole shoe, for instance the upper one, relative to the other shoe in increments of a fixed angular magnitude while observing the lens beam in an electron-microscopic system, thus determining which relative position is most favorable.

According to another feature of our invention, a shell-enclosed assembly of lens parts according to the invention is given a design, or provided with a setting means, that firmly secures the lens parts in the properly adjusted relative position. More specifically, we prefer providing the assembly with an annular screw in threaded engagement with the shell and coaxially abutting against one of the lens parts to force the lens parts against a shoulder of the shell.

Figure 2:
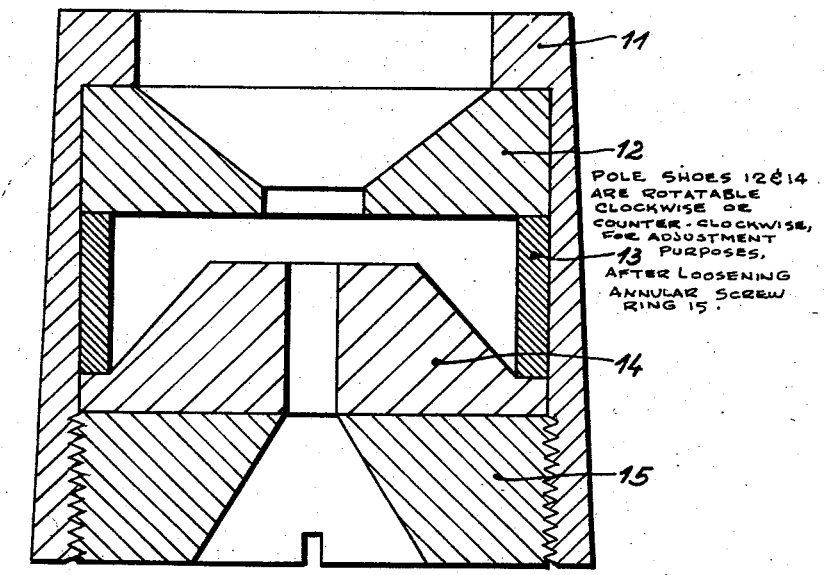

The invention will be more fully understood from the example of the embodiment described below and illustrated in the drawing, in which Fig. 1 is an axial section through an objective lens of the magnetic type for an electron microscope, and Fig. 2 shows, also in section but on a larger scale, the pole-shoe assembly of the same lens.

According to Fig. 1, the annular excitation structure of the lens has an excitation coil 1 enclosed in a capsule composed of cylindrical outer and inner jacket parts 2, 3 and two cover parts 4 and 5, all of these parts being of ferromagnetic material. The capsule also comprises an inner ring 6 of non-magnetic material. A pole-shoe system 8 is seated within a central, slightly conical opening 7 formed by parts 3, 4 and 6 of the excitation structure. According to Fig. 2, the pole-shoe system has an outer shell member 11 within which all other parts are mounted, namely an object pole shoe (upper pole shoe) 12, a non-magnetic spacer 13, and a lower pole shoe 14. The parts 12, 13 and 14 are concentrically arranged and can be turned relative to one another and relative to the shell member. The parts are held tight against one another in the shell member by means of an annular set screw 15.

The invention may also be used with lenses in which the excitation system is provided with a plurality of pole-shoe assemblies in series to provide a corresponding plurality of axially spaced lens gaps. In such a case, two or more pole-shoe pairs may be inserted into a single shell member so that the pole shoes of each pair can be turned relative to each other in the same manner as in the illustrated single-pair assembly.

In applying the invention to magnetic lenses, as in the example described above, the shell member may consist of non-magnetic material. However, it may also be made of ferro-magnetic material, since the field strength in the lens gap is so high as to fully saturate the magnetic material so that a thin-walled iron shell cannot act as a magnetic short circuit. Preferably, the shell member, together with the pole shoes secured therein, is rotatably disposed in the bore of the magnet body. Hence, the individual pole shoes can be turned and set with respect to each other, and the whole pole-shoe assembly can also be rotatably adjusted relative to the excitation system. This facilitates determining the best feasible relative position of the pole shoes in the electron-optical system. As explained, any observable deviation of the lens field from the rotational symmetry; that is, any bending of the electron-optical lens axis and axial astigmatism due to inhomogeneity of individual lens parts, can thus be greatly minimized; and, if excessive defects in the material of one lens part are discovered, it is only necessary to exchange that one part rather than discarding the entire lens system including its costly aperture control device. The individual parts of a shell-type lens system, according to the invention, are of simple shape and hence can readily be produced by lathe work with great precision.

We claim:

1. A magnetic electron lens, comprising a magnetic excitation structure having a central opening, a pole-shoe assembly having a shell member disposed in said opening of said structure, a plurality of coaxial and centrally apertured pole shoes mounted in said shell member and mutually spaced in the axial direction, annular spacing means disposed between axially adjacent ones of said pole shoes operative to maintain said adjacent pole shoes spaced by a predetermined fixed amount, said pole shoes being rotationally adjustable relative to each other, and an annular set screw in threaded engagement with said shell member for fixing said pole shoes and spacer means in an adjusted relative position.

2. An electron lens system adjustable to minimize axial astigmatism arising from non-homogeneity of the lens parts thereof, comprising a shell structure providing a cylindrical chamber, a plurality of coaxial centrally apertured cylindrical lens parts fitting in said chamber in uncoupled relationship to each other and the chamber, the structure having an apertured end and providing an abutment surface against which one of the lens parts is supported, spacer means in said shell structure adjacent the wall thereof and interposed between transverse surfaces of the respective lens parts to form a predetermined fixed width gap between the lens parts, fixing means in engagement with the shell structure and abutting against the surface of another one of the lens parts to hold said lens parts and spacer means in fixed axial position against said abutment surface of the structure, at least one of the lens parts being free, upon loosening the fixing means, to be turned about its axis without alteration of the gap and without axial displacement with respect to said shell structure, to provide said adjustment to minimize astigmatism.

3. An electron lens system adjustable to minimize axial astigmatism arising from non-homogeneity of the lens parts thereof, comprising a shell structure, a plurality of coaxial centrally apertured lens parts mounted in said structure in uncoupled relationship to each other and the structure, spacer means in said shell structure adjacent the wall thereof and interposed between transverse surfaces of the respective lens parts to form a predetermined fixed width gap between the lens parts, fixing means in engagement with the shell structure and abutting against the surface of another one of the lens parts to hold said lens parts and spacer means in fixed axial position in said structure, the adjustment to minimize axial astigmatism being obtained by loosening said fixing means, turning at least one of the lens parts about its axis, and tightening said fixing means, said turning accomplishing said adjustment without alteration of the width of the gap and without axial displacement of the lens parts with respect to the shell structure, in consequence of the said uncoupled relationship.

4. A magnetic electron lens system, comprising a magnetic excitation structure having a central opening, a pole-shoe assembly having a shell member disposed in said opening of said structure, a plurality of coaxial and centrally apertured pole shoes mounted in said shell member and mutually spaced in the axial direction, annular spacing means disposed between axially adjacent ones of said pole shoes operative to maintain said adjacent pole shoes spaced by a predetermined fixed amount, said pole shoes being rotationally adjustable relative to each other, and an annular member in engagement with said shell member and having an opening coaxial with the central opening, said annular member abutting against one of the pole shoes to hold said pole shoes and spacer means in an adjusted relative rotational position.

5. A magnetic electron lens, comprising a magnetic excitation structure having a central opening, a pole-shoe assembly having a shell member rotatably disposed in said opening of said structure, the shell member having an internal shoulder, a plurality of coaxial and centrally apertured pole shoes mounted in said shell member and mutually spaced in the axial direction, annular spacing means disposed between axially adjacent ones of said pole shoes operative to maintain said adjacent pole shoes spaced by a predetermined fixed amount, said pole shoes being rotationally adjustable relative to each other, and an annular member in engagement with said shell member and having an opening coaxial with the central opening, said annular member abutting against one of the pole shoes to hold said pole shoes and spacer means in fixed axial position against said shoulder and in an adjusted relative rotational position.

6. A magnetic electron lens system, comprising a magnetic excitation structure having a conical central opening, a pole-shoe assembly having a conical shell member rotatably disposed in said opening of said structure, the shell member having a cylindrical bore and an internal shoulder, a plurality of coaxial and centrally apertured cylindrical pole shoes mounted in said shell member and mutually spaced in the axial direction, annular spacing means disposed between axially adjacent ones of said pole shoes operative to maintain said adjacent pole shoes spaced by a predetermined fixed amount, said pole shoes being rotationally adjustable relative to each other, and an annular member in engagement with said shell member and having an opening coaxial with the central opening, said annular member abutting against one of the pole shoes to hold said pole shoes and spacer means in fixed axial position against said shoulder in an adjusted relative rotational position.

7. The lens system defined in claim 3, the system being a magnetic electron lens system, the spacing means being an annular member of non-magnetic material, the shell member being of ferromagnetic material.

References Cited in the file of this patent

UNITED STATES PATENTS

| | | |
|---|---|---|
| 2,369,782 | Hillier | Feb. 20, 1945 |
| 2,418,349 | Hillier et al. | Apr. 1, 1947 |
| 2,469,165 | Hillier | May 3, 1949 |